United States Patent
Fuse

(10) Patent No.: US 11,093,363 B2
(45) Date of Patent: Aug. 17, 2021

(54) INFORMATION PROCESSING APPARATUS FOR ALLOCATING BANDWIDTH BASED ON PRIORITY AND NON-TRANSITORY COMPUTER READABLE MEDIUM

(71) Applicant: FUJIFILM Business Innovation Corp., Tokyo (JP)

(72) Inventor: Tohru Fuse, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/541,169

(22) Filed: Aug. 15, 2019

(65) Prior Publication Data

US 2020/0218627 A1   Jul. 9, 2020

(30) Foreign Application Priority Data

Jan. 8, 2019   (JP) .............................. JP2019-001250

(51) Int. Cl.
  *G06F 11/34*   (2006.01)
  *G06F 13/374*  (2006.01)
  *H04L 12/911*  (2013.01)

(52) U.S. Cl.
  CPC ........ *G06F 11/3438* (2013.01); *G06F 11/349* (2013.01); *G06F 11/3485* (2013.01); *G06F 13/374* (2013.01); *H04L 47/70* (2013.01)

(58) Field of Classification Search
  CPC ......... H04L 47/00–829; G06F 11/3438; G06F 11/3485; G06F 11/349; G06F 13/374
  See application file for complete search history.

(56) References Cited

U.S. PATENT DOCUMENTS

| 7,933,249 | B2  |   | 4/2011 | Amalfitano |
| 9,031,083 | B2  |   | 5/2015 | Thapliya et al. |
| 10,217,466 | B2 | * | 2/2019 | Davies ................. G10L 19/005 |
| 10,219,254 | B2 | * | 2/2019 | Wu .................... H04W 72/1257 |
| 10,237,191 | B2 | * | 3/2019 | Cheng .................. H04L 49/358 |
| 10,237,816 | B2 | * | 3/2019 | Fodor ............... H04W 28/0289 |

(Continued)

FOREIGN PATENT DOCUMENTS

| JP | H10-243018  | 9/1998  |
| JP | 2003-536287 | 12/2003 |
| JP | 2013-236182 | 11/2013 |

OTHER PUBLICATIONS

Jianchi Zhu, Xiaoming She and Lan Chen, "Instantaneous channel fluctuation based scheduling for bursty traffic in OFDMA system," 2011 6th International ICST Conference on Communications and Networking in China (CHINACOM), Harbin, 2011, pp. 166-169, doi: 10.1109/ChinaCom.2011.6158141. (Year: 2011).*

(Continued)

*Primary Examiner* — Emmanuel L Moise
*Assistant Examiner* — Julian Chang
(74) *Attorney, Agent, or Firm* — JCIPRNET

(57) ABSTRACT

An information processing apparatus includes a receiving unit that receives information indicative of a priority of communication designated by a user who uses a communication line available to plural users and information indicative of a bandwidth of a priority target designated by the user; and an allocated bandwidth deciding unit that decides an allocated bandwidth allocated to the user on a basis of evaluation of the priority and the bandwidth of the priority target.

10 Claims, 12 Drawing Sheets

(56) References Cited

U.S. PATENT DOCUMENTS

| | | | |
|---|---|---|---|
| 10,313,232 B2* | 6/2019 | Ishida | H04L 45/04 |
| 10,313,243 B2* | 6/2019 | Thanasekaran | G06F 3/0613 |
| 10,326,879 B1* | 6/2019 | Makagon | G06N 20/00 |
| 10,348,572 B1* | 7/2019 | Zheng | H04L 47/783 |
| 10,353,764 B1* | 7/2019 | Cazzanti | G06N 7/005 |
| 10,367,748 B2* | 7/2019 | Short | H04L 47/32 |
| RE47,568 E* | 8/2019 | Legg | H04B 7/2656 |
| 10,390,257 B2* | 8/2019 | Maria | H04W 28/0289 |
| 10,412,619 B2* | 9/2019 | Ahmadzadeh | H04W 72/04 |
| 10,419,360 B2* | 9/2019 | Dawson | G06Q 30/08 |
| 10,419,507 B2* | 9/2019 | Taibi | H04L 67/02 |
| 10,470,078 B2* | 11/2019 | Murphy | H04W 16/24 |
| 10,491,531 B2* | 11/2019 | Lauer | H04L 47/50 |
| 10,491,930 B2* | 11/2019 | Brockmann | H04N 21/23614 |
| 10,492,105 B1* | 11/2019 | Yuan | H04W 28/22 |
| 10,530,682 B2* | 1/2020 | Anschutz | H04L 47/2408 |
| 10,609,515 B1* | 3/2020 | Bender | G01C 21/3453 |
| 10,630,600 B2* | 4/2020 | Nipane | H04L 47/80 |
| 10,630,601 B2* | 4/2020 | To | H04L 47/528 |
| 10,721,647 B2* | 7/2020 | Kotecha | H04W 28/0284 |
| 10,728,152 B2* | 7/2020 | Lau | H04L 47/12 |
| 2004/0228278 A1* | 11/2004 | Bruckman | H04L 47/10 370/231 |
| 2011/0200017 A1 | 8/2011 | Amalfitano | |
| 2016/0065485 A1* | 3/2016 | Wolcott | H04L 47/12 370/230 |
| 2016/0241483 A1* | 8/2016 | Turanyi | H04L 47/629 |
| 2016/0270098 A1 | 9/2016 | Amalfitano | |
| 2017/0223401 A1* | 8/2017 | Xu | H04N 21/41407 |
| 2018/0098248 A1* | 4/2018 | Torres | H04L 47/823 |
| 2018/0192303 A1* | 7/2018 | Hui | H04W 24/04 |
| 2018/0343181 A1* | 11/2018 | Williams | H04L 43/0882 |
| 2019/0020756 A1* | 1/2019 | Karakkad Kesavan Namboodiri | H04L 43/16 |
| 2019/0028403 A1* | 1/2019 | Moldvai | H04L 47/822 |
| 2019/0052532 A1* | 2/2019 | Chen | H04L 41/0896 |
| 2019/0089640 A1* | 3/2019 | To | H04L 12/462 |
| 2019/0123812 A1* | 4/2019 | Petranovich | H04L 47/78 |
| 2019/0149474 A1* | 5/2019 | Iyer | H04L 43/0876 370/230.1 |
| 2019/0166067 A1* | 5/2019 | Xu | H04B 7/18578 |
| 2019/0190830 A1* | 6/2019 | Litzinger | H04L 47/825 |
| 2019/0215277 A1* | 7/2019 | Dhanoa | H04L 47/528 |
| 2019/0222531 A1* | 7/2019 | Lin | H04L 43/026 |
| 2019/0245924 A1* | 8/2019 | Li | G06F 3/0605 |
| 2019/0306080 A1* | 10/2019 | Gaonkar | H04L 41/30 |
| 2019/0356783 A1* | 11/2019 | Goldstein | H04W 4/021 |
| 2019/0362842 A1* | 11/2019 | Vogtmeier | G06F 19/3418 |
| 2019/0364492 A1* | 11/2019 | Azizi | H04W 92/045 |
| 2019/0380065 A1* | 12/2019 | Kim | H04L 47/20 |
| 2019/0394096 A1* | 12/2019 | Bernat | G06F 9/5083 |
| 2020/0007452 A1* | 1/2020 | Nguyen | H04L 47/27 |
| 2020/0007453 A1* | 1/2020 | Maniyar | H04L 67/306 |
| 2020/0014486 A1* | 1/2020 | Harrang | H04L 65/80 |
| 2020/0029110 A1* | 1/2020 | Xin | H04N 21/2402 |
| 2020/0037211 A1* | 1/2020 | Hine | H04W 36/0058 |
| 2020/0045687 A1* | 2/2020 | Lee | G01C 21/26 |
| 2020/0092622 A1* | 3/2020 | Oh | H04L 47/6275 |
| 2020/0112483 A1* | 4/2020 | Sridhar | H04L 47/24 |
| 2020/0205030 A1* | 6/2020 | Wang | H04W 24/08 |
| 2020/0205152 A1* | 6/2020 | Zheng | H04W 72/044 |
| 2020/0218627 A1* | 7/2020 | Fuse | G06F 11/3438 |
| 2020/0228614 A1* | 7/2020 | Jain | H04L 65/4015 |
| 2020/0259750 A1* | 8/2020 | Iyer | H04L 43/0894 |
| 2020/0267070 A1* | 8/2020 | Williams | H04L 47/822 |
| 2020/0274819 A1* | 8/2020 | Nahum | H04L 47/6275 |

OTHER PUBLICATIONS

Kumar, K. Susheel, et al. "Sports video summarization using priority curve algorithm." International Journal on Computer Science & Engineering 2.9 (2010): 2996-3002. (Year: 2010).*

* cited by examiner

FIG. 6

| USER ID | PRIORITY | BANDWIDTH OF PRIORITY TARGET [Mbps] | ALLOCATION RATE [%] | ALLOCATED BANDWIDTH [Mbps] |
|---|---|---|---|---|
| 1 | 1.0 | 3 | 97.6 | 2.92 |
| 2 | 0.5 | 2 | 49.9 | 1.00 |
| 3 | 0.5 | 1 | 49.9 | 0.50 |
| 4 | 0.3 | 8 | 15.8 | 1.26 |
| 5 | 1.0 | 5 | 97.6 | 4.88 |
| TOTAL | | | | 10.56 |

AVERAGE OF PRIORITIES: 0.66    STANDARD DEVIATION OF PRIORITIES: 0.29

FIG. 9

| USER ID | PRIORITY | ALLOCATED BANDWIDTH [Mbps] | REDUCTION RATE [%] | REDUCTION BANDWIDTH [Mbps] |
|---|---|---|---|---|
| 1 | 1.0 | 2.92 | 2.4(100−97.6) | 0.07 |
| 2 | 0.5 | 1.00 | 50.1(100−49.9) | 0.50 |
| 3 | 0.5 | 0.50 | 50.1(100−49.9) | 0.25 |
| 4 | 0.3 | 1.26 | 84.2(100−15.8) | 1.06 |
| 5 | 1.0 | 4.88 | 2.4(100−97.6) | 0.24 |

INFORMATION PROCESSING APPARATUS FOR ALLOCATING BANDWIDTH BASED ON PRIORITY AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-001250 filed Jan. 8, 2019.

BACKGROUND (i) Technical Field

The present disclosure relates to an information processing apparatus and a non-transitory computer readable medium.

(ii) Related Art

A technique for allocating bandwidths to users in a case where a communication line such as a network is used by plural users is known.

Japanese Unexamined Patent Application Publication No. 10-243018 describes an apparatus that calculates an evaluation value of a data flow by using an index of a packet according to a user's request, decides priorities of data flows by using such evaluation values, and allocates bandwidths to the data flows on the basis of the priorities of the data flows.

Japanese Unexamined Patent Application Publication (Translation of PCT Application) No. 2003-536287 describes a technique for deciding priorities on the basis of access histories of users.

SUMMARY

Aspects of non-limiting embodiments of the present disclosure relate to making it possible to allocate a bandwidth reflecting a user's request to the user in a case where a communication line available to plural users is used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a receiving unit that receives information indicative of a priority of communication designated by a user who uses a communication line available to plural users and information indicative of a bandwidth of a priority target designated by the user; and an allocated bandwidth deciding unit that decides an allocated bandwidth allocated to the user on a basis of evaluation of the priority and the bandwidth of the priority target.

BRIEF DESCRIPTION OF THE DRAWINGS

An exemplary embodiment of the present disclosure will be described in detail based on the following figures, wherein:

FIG. 6 illustrates an example of an allocated bandwidth;

FIG. 9 illustrates an example of a reduction bandwidth;

DETAILED DESCRIPTION

Figure 1:
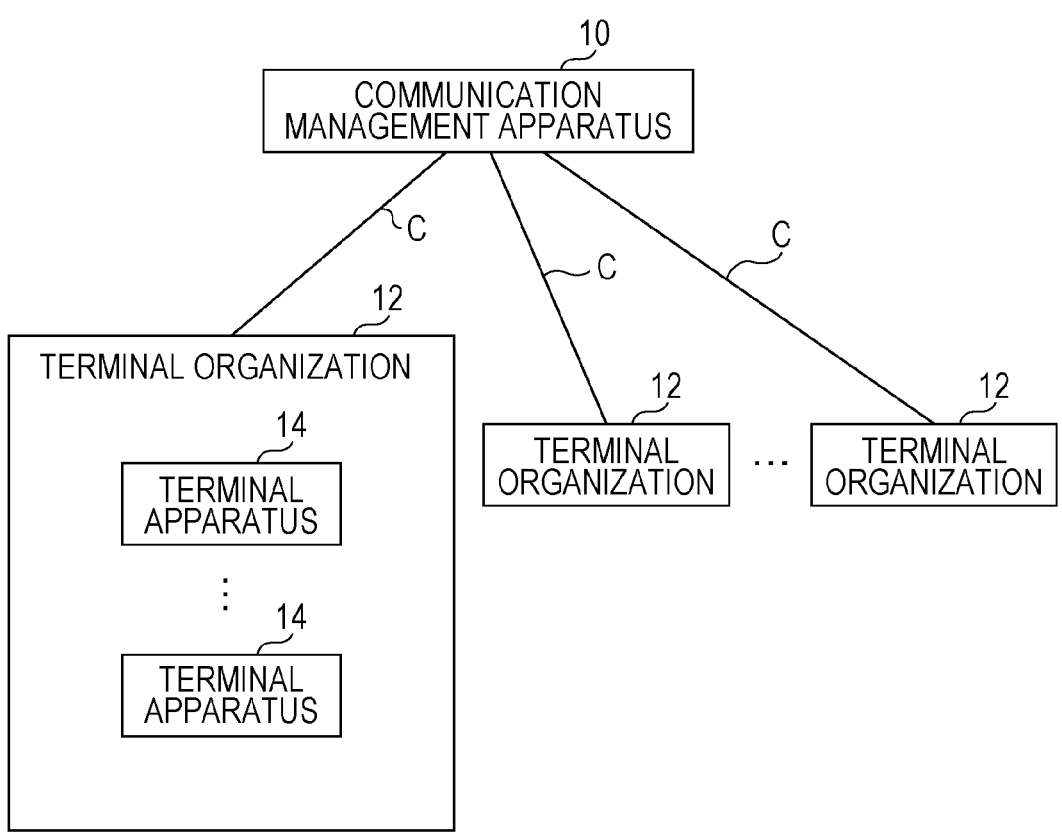
FIG. 1 is a block diagram illustrating a configuration of a communication management system according to the present exemplary embodiment.

A communication management system that is an information processing system according to an exemplary embodiment of the present disclosure is described with reference to FIG. 1. FIG. 1 illustrates an example of a configuration of a communication management system according to the present exemplary embodiment.

The communication management system according to the present exemplary embodiment includes, for example, a communication management apparatus 10 that is an information processing apparatus and one or more terminal organizations 12. Each of the terminal organizations 12 includes one or more terminal apparatuses 14. The communication management apparatus 10 and the terminal apparatuses 14 are connected to a communication line C (communication channel C). The communication management apparatus 10 and the terminal apparatuses 14 may be connected to plural communication lines C.

The communication line C may be a wireless line, may be a wired line, or may be a line including both of a wireless line and a wired line. The kind of communication line C is not limited in particular, and the communication line C may be, for example, an Internet line, a mobile telephone line, or another network (e.g., LAN).

The communication management apparatus 10 is configured to control a bandwidth of communication allocated to a user who uses the communication line N.

Each of the terminal organizations 12 is, for example, an organization, such as a company, an association, or a community, including one or more users. Needless to say, each of the terminal organizations 12 may be an organization other than these organizations. One or more communication lines C are allocated to each of the terminal organizations 12. In the example illustrated in FIG. 1, a single communication line C is allocated to each of the terminal organizations 12, but plural communication lines C may be allocated to each of the terminal organizations 12.

Each of the terminal apparatuses 14 is an apparatus that has a communication function and is, for example, a mobile terminal apparatus such as a smartphone, a tablet PC, or a mobile phone, a personal computer (PC), a server, or another apparatus (an apparatus that has an information processing function and a communication function).

In the present exemplary embodiment, use of the communication line C is requested by each user. Furthermore, a priority of communication and a bandwidth of a priority target are designated by each user, and an allocated bandwidth allocated to the user is decided on the basis of evaluation of the priority and the bandwidth of the priority target.

Figure 2:
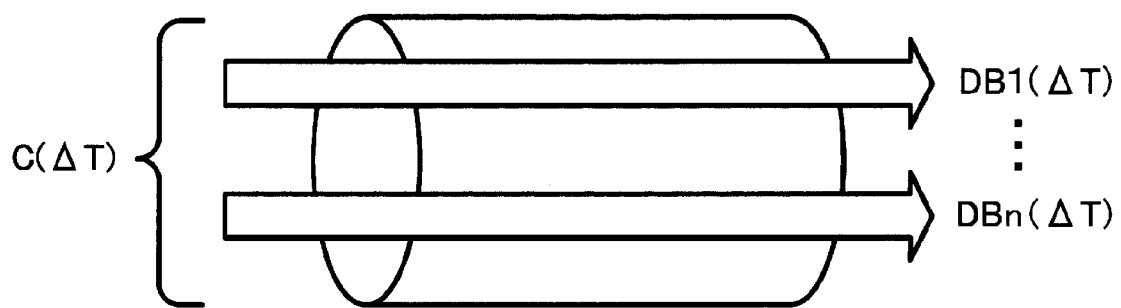
FIG. 2 is a schematic view for explaining a concept of a bandwidth used on a communication line.

A bandwidth used on the communication line C is described below with reference to FIG. 2. FIG. 2 illustrates a concept of the bandwidth.

An effective bandwidth on the communication line C in a case where a length of a sampling time is a unit time $\Delta t$ is defined as $C(\Delta t)$ [Mbps]. A bandwidth used in communication DBn (n=1, ..., N) is defined as $DBn(\Delta t)$ [Mbps]. In a case where a condition expressed by the following formula (1) is met, i.e., in a case where a sum of bandwidths $DBn(\Delta t)$ is equal to or smaller than the effective bandwidth $C(\Delta t)$, no bandwidth limitation is imposed on communication DBn. Meanwhile, in a case where the sum of bandwidths $DBn(\Delta t)$ is larger than the effective bandwidth $C(\Delta t)$, bandwidth limitation is imposed on communication DBn.

$$C(\Delta t) \geq \sum_{n=1}^{N} DBn(\Delta t) \quad (1)$$

Figure 3:
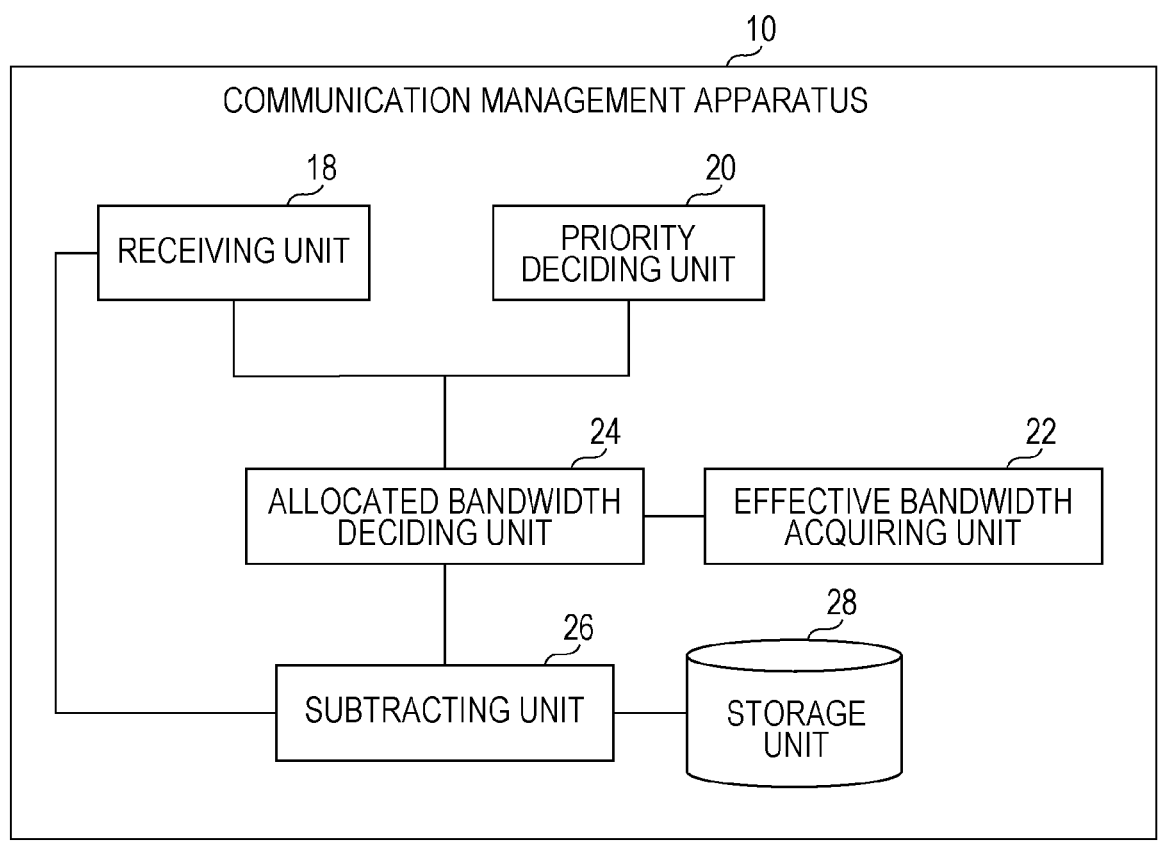
FIG. 3 is a block diagram illustrating a configuration of a communication management apparatus according to the present exemplary embodiment.

A configuration of the communication management apparatus 10 is described in detail below with reference to FIG. 3. FIG. 3 illustrates an example of a configuration of the communication management apparatus 10.

A receiving unit 18 is configured to receive information indicative of a user's request of use of the communication line C, information indicative of a priority of communication designated by a user who uses the communication line C, and information indicative of a bandwidth of a priority target designated by the user. A priority is designated for preferential use of the communication line C. A higher priority means that a user who has designated the priority can preferentially use the communication line C. For example, a higher priority means that a bandwidth is preferentially allocated to a user who has designated the priority. A bandwidth of a priority target is a bandwidth for which a user requests use. A user may request, as a bandwidth of a priority target, an amount of communication (e.g., a volume of distributed data that is a communication target) for which the user requests use. For example, when a user designates a priority and a bandwidth of communication and requests use of the communication line C by using the terminal apparatus 14, information indicative of the use request, information indicative of the priority, and information indicative of the bandwidth are transmitted from the terminal apparatus 14 to the communication management apparatus 10 and are received by the receiving unit 18. The receiving unit 18 receives information indicative of a use request of each user and receives information indicative of a priority and a bandwidth designated by each user.

A priority bundle for designation of a priority is allocated to each user, and each user designates a priority by using a priority bundle allocated to the user. For example, a user needs to pay for a priority bundle, and when a user purchases a priority bundle, the priority bundle is allocated to the user. For example, a priority bundle according to a paid fee is allocated to a user who has purchased the priority bundle. Each user can refill the priority bundle by paying a fee.

A priority deciding unit 20 is configured to decide a priority needed to maintain predetermined communication quality on the communication line C. For example, the priority deciding unit 20 automatically decides a priority needed to maintain predetermined communication quality on the communication line C instead of a priority designated by a user. The priority deciding unit 20 decides a priority needed to maintain communication quality, for example, on the basis of a call loss probability of a service provided by using the communication line C.

An effective bandwidth acquiring unit 22 is configured to acquire an effective bandwidth of the communication line C. For example, the effective bandwidth acquiring unit 22 acquires a bandwidth of the communication line C available in a unit time as an effective bandwidth of the communication line C in the unit time. The effective bandwidth is, for example, a remaining bandwidth excluding a bandwidth of the communication line C used by a user (e.g., a business operator) other than the communication management system according to the present exemplary embodiment and is a bandwidth that is expected to be available to the communication management system according to the present exemplary embodiment.

An allocated bandwidth deciding unit 24 is configured to decide an allocated bandwidth allocated to a user on the basis of evaluation of a priority and a bandwidth of a priority target designated by the user. For example, the receiving unit 18 receives information indicative of priorities of communication designated by users who use the same communication line C and information indicative of bandwidths of priority targets designated by the users. The allocated bandwidth deciding unit 24 calculates allocation rates (allocation amounts) of the users as evaluation values on the basis of a distribution of the priorities and decides allocated bandwidths allocated to the users on the basis of the bandwidths of the priority targets designated by the users and the allocation rates of the users. For example, the allocated bandwidth deciding unit 24 calculates an allocated bandwidth allocated to each user by multiplying a bandwidth of a priority target designated by the user by an allocation rate of the user. The distribution of priorities may be, for example, a distribution of priorities designated by users, may be a distribution of priorities decided by the priority deciding unit 20, or may be a predetermined statistical distribution. For example, a Gaussian distribution (a normal distribution) of statistically-decided priorities may be used as the distribution of priorities. An allocated bandwidth allocated to a user is a bandwidth of communication available to the user, and each user can perform communication by using an allocated bandwidth allocated to the user.

A subtracting unit 26 is configured to subtract a value according to a degree of priority of communication of a user from a priority bundle of the user. For example, the subtracting unit 26 may subtract a larger value from the priority bundle as a higher priority is designated by the user or may subtract a larger value from the priority bundle as a wider allocated bandwidth is allocated. For example, the value subtracted from the priority bundle may fluctuate in accordance with bandwidths of priority targets designated by other users or may fluctuate in accordance with an effective bandwidth.

A storage unit 28 is one or more storage regions in which various kinds of information (e.g., data and a program) are stored. The storage regions may be defined as one or more storage devices (e.g., physical drives such as a hard disk drive and a memory) provided in the communication management apparatus 10 or may be defined as logical partitions or logical drives set in one or more storage devices. For example, information indicative of a priority bundle allocated to each user is stored in the storage unit 28.

Figure 4:
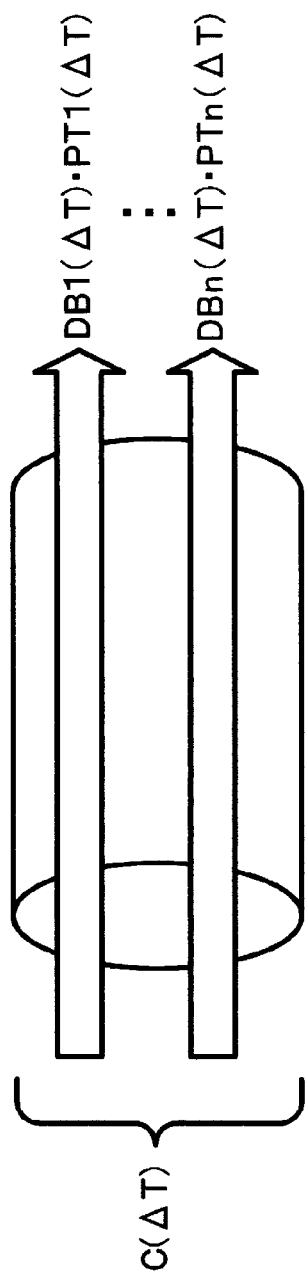
FIG. 4 is a schematic view for explaining a concept of a bandwidth used on a communication line.

A bandwidth in a case where a priority is designated is described below with reference to FIG. 4. FIG. 4 illustrates a concept of the bandwidth.

An effective bandwidth on the communication line C in a case where a length of a sampling time is a unit time Δt is defined as C(Δt) [Mbps]. A bandwidth used in communication DBn (n=1, . . . , N) is defined as DBn(Δt) [Mbps]. The number of users who use the communication line C is defined as N. A priority (prime ticket) is defined as PTn(Δt) (n=1, . . . , N). A range of PTn(Δt) is as follows: PTn(Δt) is larger than 0 and is equal to or smaller than 1. That is, "1" is a highest priority value, and "0" is a lowest priority value.

In a case where a condition expressed by the following formula (2) is met, no bandwidth limitation is imposed on communication DBn. In other words, the bandwidth DBn(Δt) and PTn(Δt) need be decided so that the condition expressed by the formula (2) is met.

$$C(\Delta t) \geq \sum_{n=1}^{N} DBn(\Delta t) \cdot PTn(\Delta t) \quad (2)$$

A method for calculating a call loss probability is described below. The "call" is a request for connection to a communication line. The "number of calls" is the number of "calls" that occur in a unit time. A "call amount" is an amount of use of the communication line C per unit time. The "call loss probability" is a probability of failure to use the communication line C when a "call" occurs. For example, a call loss probability is calculated on the basis of a call amount and the number of communication lines in accordance with the known Erlang B Formula as expressed by the following formula (3). In the formula (3), n is the number of communication lines, e is a call amount (erlang), and B is a call loss probability. Note that it is assumed that a probability of occurrence of each communication obeys a Poisson distribution.

$$e = \frac{\text{the number of calls} \times \text{communication period}}{\text{unit time}} \quad B = \frac{\frac{e^n}{n!}}{1 + \frac{e^n}{1!} + \ldots + \frac{e^n}{n!}} \quad (3)$$

Figure 5:
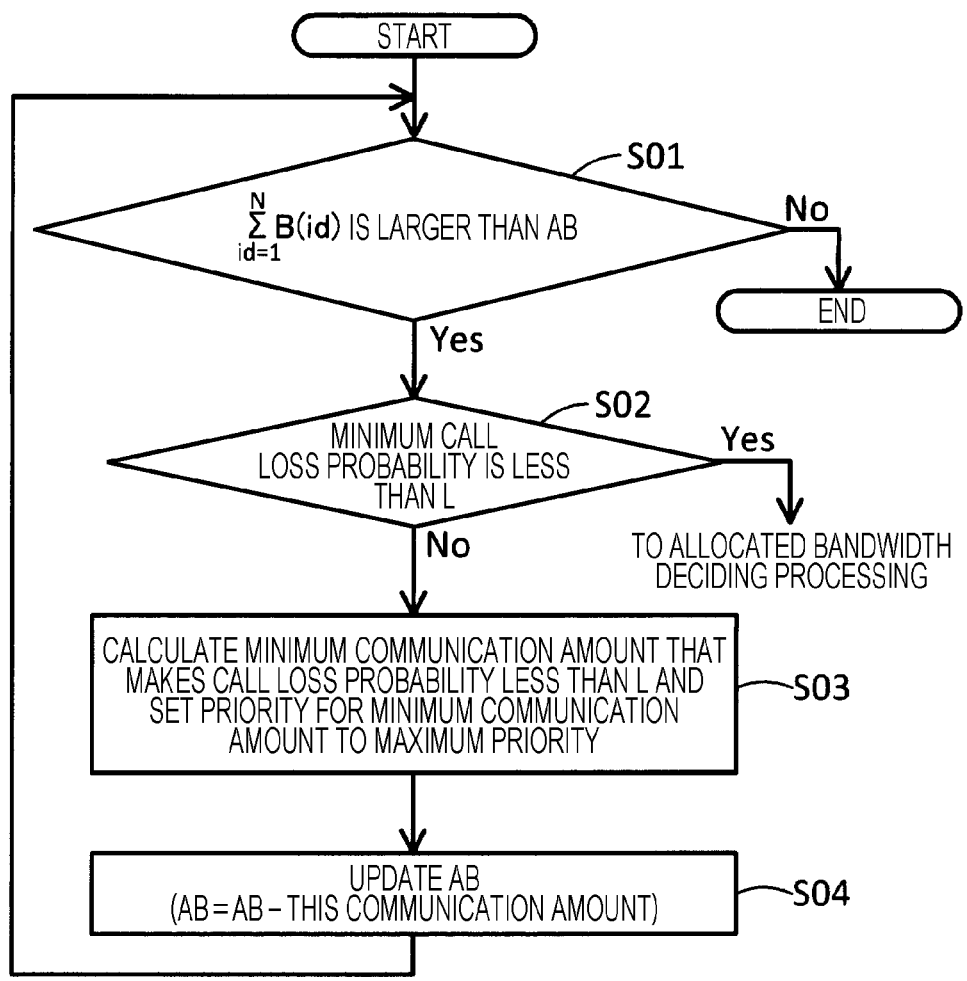
FIG. 5 is a flowchart concerning processing for deciding a priority on the basis of a call loss probability.

Processing for deciding a priority on the basis of a call loss probability is described below with reference to FIG. 5. FIG. 5 is a flowchart concerning this processing.

An effective bandwidth on the communication line C in a unit time is defined as AB. An identifier of a user is defined as id(i) (i=1, . . . , N). The number of users who concurrently use the same communication line C is N. A bandwidth of a priority target designated by each user is defined as B(id). B(id) corresponds to an amount of communication (e.g., a volume of distributed data) requested by a user. A call loss probability of the whole communication service is defined as L. In a case where plural different communication services are used, a lowest call loss probability is set as a value of L. A range of a priority of each user is expressed as follows: Pt(id(i)) is larger than 0 and is equal to or smaller than 1 where i=1, . . . , N.

First, the priority deciding unit 20 calculates a sum of bandwidths B(id) of priority targets of N users who use the communication line C.

In a case where the sum of the bandwidths B(id) is equal to or smaller than the effective bandwidth AB (No in S01), the processing of the priority deciding unit 20 is finished. In this case, the bandwidths B(id) of the priority targets designated by the users are allocated to the users, and the users perform communication by using the bandwidths B(id) allocated to the users.

In a case where the sum of the bandwidths B(id) is larger than the effective bandwidth AB (Yes in S01) and in a case where a minimum call loss probability of the service corresponding to the kind of communication for which a use request has been given is less than the call loss probability L of the whole service (Yes in S02), the processing shifts to processing of the allocated bandwidth deciding unit 24.

In a case where the sum of the bandwidths B(id) is larger than the effective bandwidth AB (Yes in S01) and a case where the minimum call loss probability of the service is equal to or larger than the call loss probability L (No in S02), the priority deciding unit 20 calculates a minimum communication amount that makes the call loss probability less than L and sets a priority for the minimum communication amount to a maximum priority (S03). Then, the priority deciding unit 20 updates Ab to "AB—this communication amount" (S04). The processing shifts to S01.

A call loss probability is sometimes decided depending on the kind of communication. For example, in a case where VoIP traffic is included, a call loss probability need be less than 0.15 (15%). In this case, a priority is decided so that the call loss probability becomes less than a call loss probability decided for VoIP communication.

Figure 7:
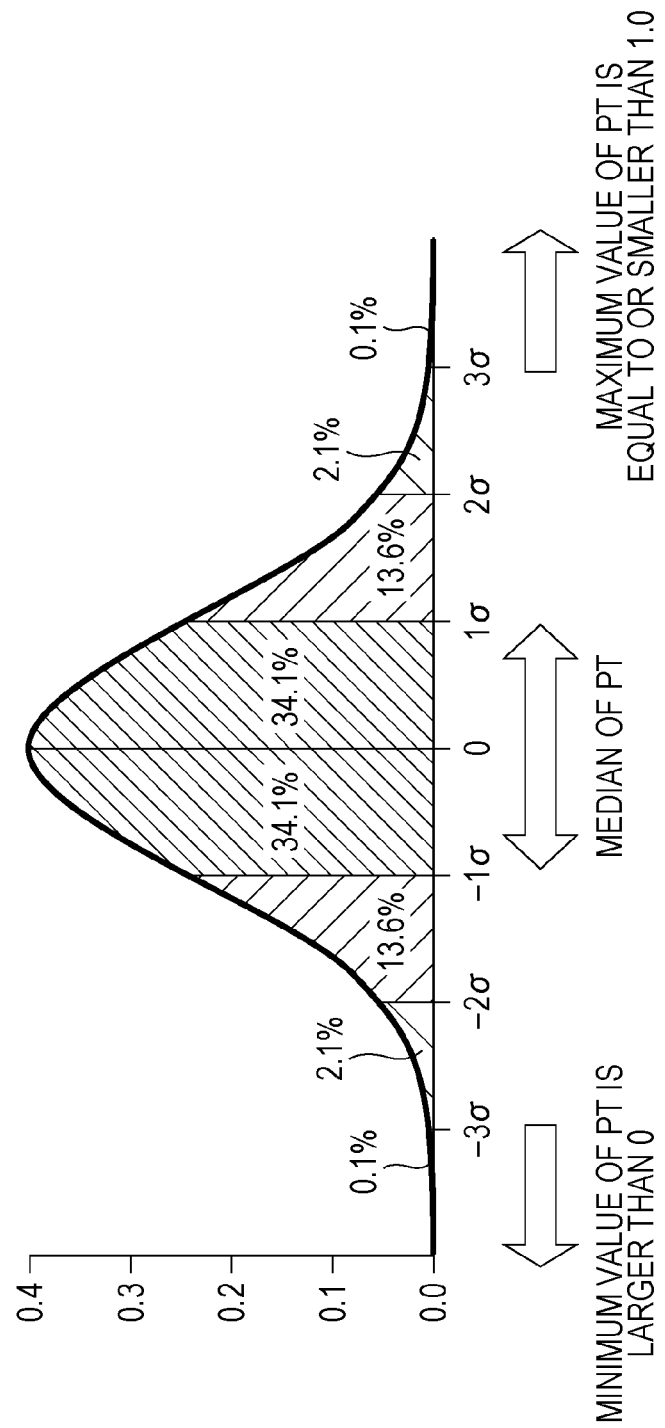
FIG. 7 illustrates a priority distribution.
Figure 8:
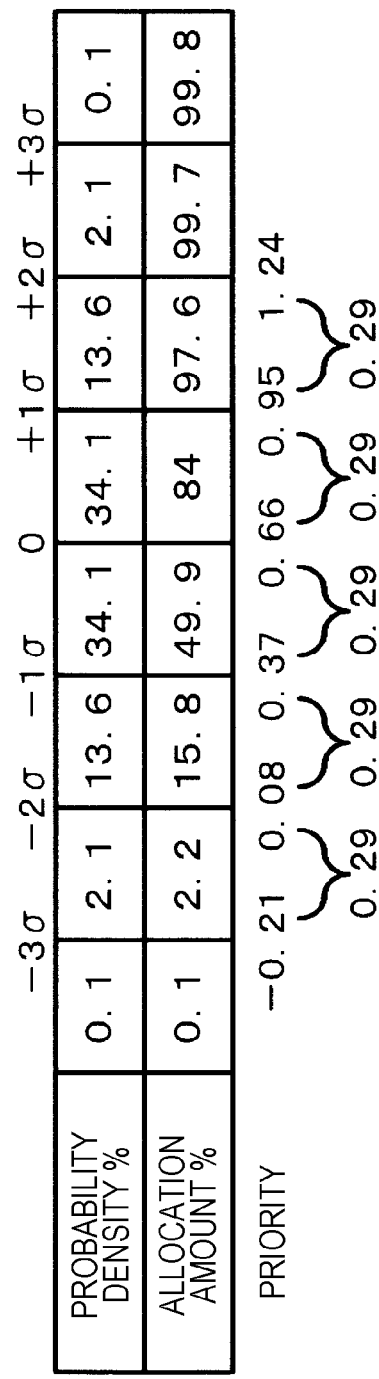
FIG. 8 illustrates an allocation rate (allocation amount) based on the priority distribution.

Processing of the allocated bandwidth deciding unit 24 is described with reference to FIGS. 6 through 8. FIG. 6 illustrates an example of allocated bandwidths. FIG. 7 illustrates a Gaussian distribution (a normal distribution) as a distribution of priorities. FIG. 8 illustrates an example of allocation rates (allocation amounts) based on the distribution of priorities.

For example, it is assumed that the receiving unit 18 receives a request for use of the same communication line C from five users and that the five users concurrently use the same communication line C. The concept of concurrent use of the communication line C encompasses a situation in which periods in which the users use the communication line C completely match one another and a situation in which the periods in which the users use the communication line C partially match one another. The periods for use of the users may be reserved by the users. Needless to say, the users may request use of the communication line C without reserving a period for use.

FIG. 6 illustrates priorities of communication and bandwidths [Mbps] of priority targets designated by the users. Communication amounts requested by the users may be designated as the bandwidths of the priority targets. For example, a user 1 designates "1.0" as a priority and designates "3" as a bandwidth of a priority target. These values are values requested by the user 1. Note that "1" is a value indicative of a highest priority, and "0" is a value indicative of a lowest priority. That is, the user 1 requests use of a bandwidth of 3 [Mbps] with a highest priority (with a top priority). Similarly, the other users designate priorities and bandwidths requested by the users. Priorities decided by the priority deciding unit 20 may be used as priorities of the users.

First, the allocated bandwidth deciding unit 24 calculates a sum of the priorities designated by the users, an average of the priorities, and a standard deviation of the priorities. The sum of the priorities is 3.3 (=1.0+0.5+0.5+0.3+1.0), the average of the priorities is 0.66 (=3.3/5), and the standard deviation σ of the priorities is 0.29.

Next, the allocated bandwidth deciding unit 24 calculates allocation rates (allocation amounts) of the users on the basis of a distribution of the priorities. For example, in a case where the distribution of the priorities designated by the users forms a Gaussian distribution (a normal distribution) as illustrated in FIG. 7, the allocated bandwidth deciding unit 24 calculates allocation rates of the users on the basis of the Gaussian distribution. In FIG. 7, the horizontal axis represents a priority (PT) as a random variable, and the vertical axis represents a probability density.

FIG. 8 illustrates allocation amounts (allocation rates) [%] based on the Gaussian distribution illustrated in FIG. 7. For example, allocation amounts according to probability densities [%] of the priorities are decided in advance. The allocated bandwidth deciding unit 24 associates the priorities and the allocation amounts so that an allocation amount becomes larger as a priority designated by a user becomes higher in accordance with the standard deviation σ of the priorities. For example, since the standard deviation σ is 0.29, the priorities, the probability densities, and the allocation amounts are associated with one another so that the priority changes by 0.29 every 1σ.

Next, the allocated bandwidth deciding unit 24 decides allocation amounts (allocation rates) corresponding to the priorities of the users on the basis of the correspondences between the allocation amounts and the priorities. For example, the priority designated by the user 1 is "0.1", and the priority is within a range of "0.95" to "1.24" in FIG. 8. Since an allocation amount (allocation rate) "97.6%" is associated with this priority range, an allocation amount (allocation rate) corresponding to the priority "1.0" is "97.6%". Similarly, the allocated bandwidth deciding unit 24 decides allocation amounts (allocation rates) corresponding to the priorities of the other users.

Next, the allocated bandwidth deciding unit 24 calculates an allocated bandwidth allocated to each user by multiplying a bandwidth of a priority target designated by the user by an allocation amount (allocation rate) of the user. Since the allocation amount of the user 1 is "97.6%", an allocated bandwidth allocated to the user is "2.92 [Mbps]". Similarly, the allocated bandwidth deciding unit 24 decides allocated bandwidths of the other users. FIG. 6 illustrates allocation amounts (allocation rates) and allocated bandwidths [Mbps] of the users.

Next, the allocated bandwidth deciding unit 24 calculates a sum (AIB [Mbps]) of the allocated bandwidths of the users.

In a case where the sum AIB of the allocated bandwidths is equal to or smaller than the effective bandwidth AB in a unit time, the allocated bandwidth deciding unit 24 allocates the allocated bandwidths to the users. This allows the users to perform communication by using the allocated bandwidths allocated to the users.

In a case where the sum AIB of the allocated bandwidths is larger than the effective bandwidth AB, the allocated bandwidth deciding unit 24 reduces the allocated bandwidths of the users so that the sum AIB of the allocated bandwidths becomes equal to or smaller than the effective bandwidth AB. For example, in the example illustrated in FIG. 6, the sum AIB is "10.56 [Mbps]". For example, in a case where the effective bandwidth AB is "9.0 [Mbps]", the sum AIB is larger than the effective bandwidth AB, and therefore the allocated bandwidth deciding unit 24 reduces the allocated bandwidths of the users. In this example, the allocated bandwidth deciding unit 24 reduces the bandwidths by 10.56−9=1.56.

This reducing processing is described with reference to FIG. 9. FIG. 9 illustrates the priorities and allocated bandwidths designated by the users.

First, the allocated bandwidth deciding unit 24 decides reduction rates [%] of the respective users on the basis of the allocation rates (allocation amounts) of the users. The reduction rate is a rate of a bandwidth by which an allocated bandwidth is reduced. Specifically, the allocated bandwidth deciding unit 24 calculates the reduction rate of each user by subtracting an allocation rate of the user from 100[%]. For example, since the allocation rate of the user 1 is 97.6[%], a reduction rate of the user is 2.4[%] (=100−97.6).

Next, the allocated bandwidth deciding unit 24 calculates a reduction bandwidth [Mbps] of each user by multiplying an allocated bandwidth of the user by the reduction rate. For example, the reduction bandwidth of the user 1 is "0.07 [Mbps]".

Next, the allocated bandwidth deciding unit 24 calculates an allocated bandwidth after reduction of each user by subtracting a reduction bandwidth of the user from an allocated bandwidth of the user.

In a case where a sum of allocated bandwidths after reduction of the users is equal to or smaller than the effective bandwidth AB, the allocated bandwidth deciding unit 24 allocates the allocated bandwidths after reduction to the users. This allows the users to perform communication by using the allocated bandwidths after reduction allocated to the users.

In a case where the sum of allocated bandwidths after reduction of the users is larger than the effective bandwidth AB, the allocated bandwidth deciding unit 24 performs the reducing processing again. That is, the allocated bandwidth deciding unit 24 calculates, for each user, a reduction bandwidth by multiplying an allocated bandwidth after reduction of the user by a reduction rate and subtracts the reduction bandwidth from the allocated bandwidth after reduction. The allocated bandwidth deciding unit 24 repeats this reducing processing until a sum of allocated bandwidths after reduction of the users becomes equal to or smaller than the effective bandwidth.

The allocated bandwidth deciding unit 24 may subtract, for a specific user, a reduction bandwidth from an allocated bandwidth instead of subtracting, for all users, a reduction bandwidth from an allocated bandwidth and may omit subtraction of a reduction bandwidth from an allocated bandwidth as for a user other than the specific user. For example, the allocated bandwidth deciding unit 24 sets a user who designates a low priority as a specific user rather than a user who designates a high priority and subtracts a reduction bandwidth from an allocated bandwidth of the specific user. More specifically, the allocated bandwidth deciding unit 24 subtracts a reduction bandwidth from an allocated bandwidth in an order from a user who designates a lower priority to a user who designates a higher priority until a sum of allocated bandwidths of the users becomes equal to or smaller than the effective bandwidth. In the example illustrated in FIG. 9, the priority of the user 2 is "0.5", and the reduction bandwidth of the user 2 is "0.50". The priority of the user 4 is "0.3", and the reduction bandwidth of the user 4 is "1.06". Since a sum of these reduction bandwidths is "1.56", this value satisfies a condition of a bandwidth needed to make a sum of allocated bandwidths equal to or smaller than the effective bandwidth AB. Among all users, the priority of the user 4 is a lowest priority, and the priority of the user 2 is a second lowest priority. In this case, the allocated bandwidth deciding unit 24 sets the user 2 and the user 4 as specific users and subtracts reduction bandwidths from the allocated bandwidths of the user 2 and the user 4. This makes it possible to make a sum of the allocated bandwidths equal to or smaller than the effective bandwidth without reducing allocated bandwidths of users of higher priorities.

In a case where there is a remaining effective bandwidth on the communication line C after allocated bandwidths allocated to the respective users are decided, i.e., in a case where a sum of the allocated bandwidths of the users is less than the effective bandwidth, the allocated bandwidth deciding unit 24 may further allocate the remaining bandwidth to the users. For example, as for the user 1, the bandwidth of the priority target is "3", and the allocated bandwidth is "2.92", and a difference between the bandwidth of the priority target and the allocated bandwidth is "0.08". In this case, the allocated bandwidth deciding unit 24 calculates a bandwidth for reallocation by multiplying the difference "0.08" by the allocation rate (allocation amount) and allocates the bandwidth for reallocation to the user 1. Similar processing is also performed for the other users. Also in this case, in a case where a sum of allocated bandwidths after reallocation of the users is larger than the effective bandwidth, the allocated bandwidth deciding unit 24 executes the reducing processing.

Although the priorities illustrated in FIG. 6 are priorities designated by the users, the priorities illustrated in FIG. 6 may be priorities decided by the priority deciding unit 20. Alternatively, the priorities illustrated in FIG. 6 may include both a priority designated by a user and a priority decided by the priority deciding unit 20. That is, a priority designated by a user may be used or a priority decided by the priority deciding unit 20 may be used depending on the user.

When allocated bandwidths are allocated to the users as described above, the subtracting unit 26 subtracts, for each user, a value according to a degree of priority of communication of the user from a priority bundle of the user. For example, the subtracting unit 26 subtracts a larger value from a priority bundle of a user who designates a higher priority. In the example illustrated in FIG. 9, the subtracting unit 26 subtracts a largest value from priority bundles of the user 1 and the user 5, subtracts a next largest value from priority bundles of the user 2 and the user 3, and subtracts a smallest value from a priority bundle of the user 4.

In another example, the subtracting unit 26 may subtracts, for each user, a value decided on the basis of an allocated bandwidth actually allocated to the user from a priority bundle of the user. For example, the subtracting unit 26 subtracts a larger value from a priority bundle of a user to whom a wider allocated bandwidth is allocated. Since an allocated bandwidth actually allocated to a user fluctuates in accordance with priorities designated by the other users, bandwidths of priority targets designated by the other users, and the effective bandwidth, a value subtracted from a priority bundle fluctuates in accordance with the priorities designated by the other users, the bandwidths of the priority targets, and the effective bandwidth.

Also in a case where priorities are automatically decided by the priority deciding unit 20, the subtracting unit 26 subtracts values according to the decided priorities or allocated bandwidths decided on the basis of the priorities from the priority bundles.

In a case where a priority bundle decreases as a result of subtraction from the priority bundle as described above and a remaining amount of the priority bundle does not satisfy a value (a value according to a priority or an allocated bandwidth) necessary for designation of a priority, a user who has the priority bundle is prohibited from designating a priority or prohibited from performing communication using the communication line C. In a case where the user purchases the priority bundle and the priority bundle is refilled and as a result a remaining amount of the priority bundle satisfies a value (a value according to a priority or an allocated bandwidth) necessary for designation of a priority, the user who has the priority bundle is permitted to designate a priority or permitted to perform communication using the communication line C.

As described above, since an allocated bandwidth allocated to a user is decided in consideration of a priority and a bandwidth of a priority target designated by the user, a bandwidth reflecting a request of the user is allocated to the user.

In a case where a request for use of the communication line C suddenly occurs, the allocated bandwidth deciding unit 24 decides an allocated bandwidth of each user by also taking this use request into consideration each time. For example, in a case where a new user (a sixth user) requests use of the same communication line C in addition to the five users, the allocated bandwidth deciding unit 24 recalculates allocated bandwidth of the respective users in consideration of a priority and a bandwidth of a priority target designated by the new user. The recalculated allocated bandwidths are allocated to the respective users.

Modification 1

Modification 1 is described below. In Modification 1, in a case where allocated bandwidths allocated to the users exceed the effective bandwidth of the communication line C, the allocated bandwidth deciding unit 24 allocates excess communication to another communication line C having a bandwidth that is not being used. For example, the allocated bandwidth deciding unit 24 allocates excess distributed data to the other communication line C. The excess distributed data is distributed by using the other communication line C. More specifically, in a case where a sum of allocated bandwidths allocated to the users exceeds the effective bandwidth of the communication line C, the allocated bandwidth deciding unit 24 allocates excess distributed data of the users to another communication line C.

Figure 10:
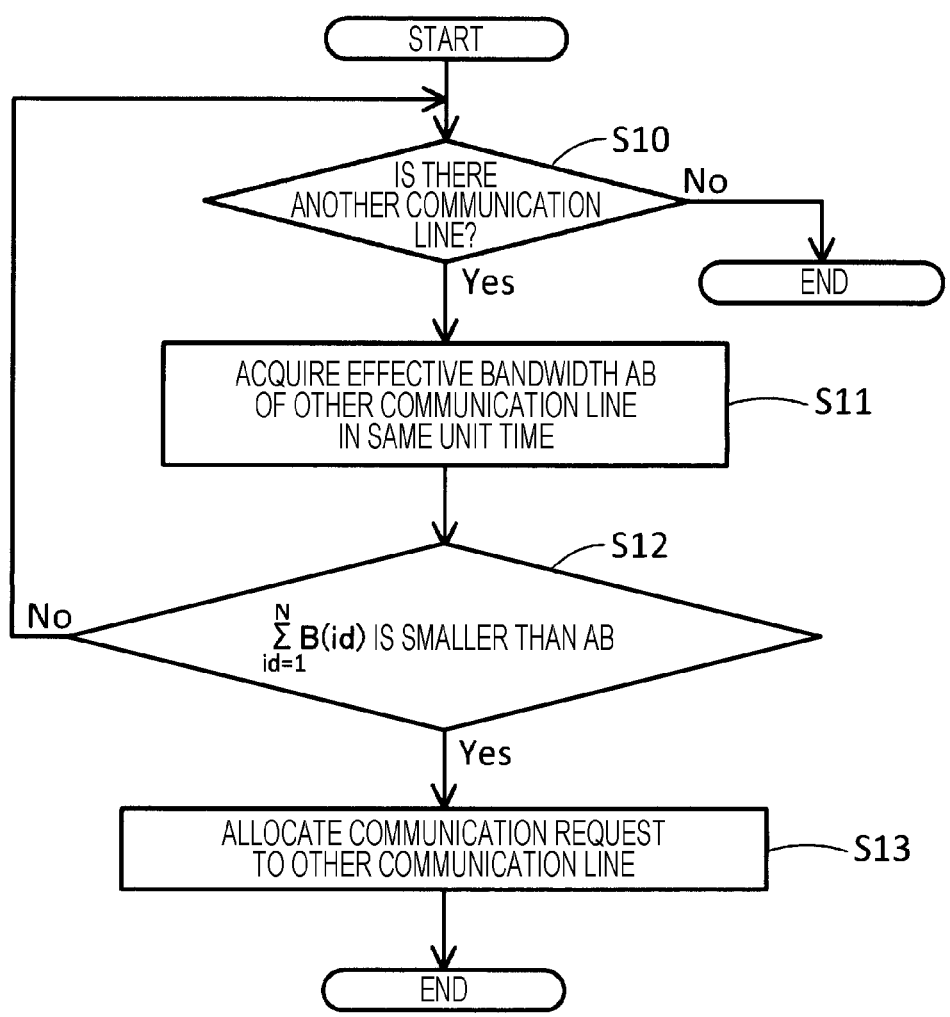
FIG. 10 is a flowchart concerning processing according to Modification 1.

Processing according to Modification 1 is described in detail below with reference to FIG. 10. FIG. 10 is a flowchart concerning the processing according to Modification 1. For example, it is assumed that in a case where five users concurrently use the same communication line C1 as illustrated in FIG. 6, a sum of allocated bandwidths allocated to the users exceeds an effective bandwidth of the communication line C1.

First, the allocated bandwidth deciding unit 24 checks whether or not there is another communication line C available to the five users (S10). For example, in a case where plural communication lines C are allocated to the terminal organization 12 to which the five users belong, the allocated bandwidth deciding unit 24 determines that there is another available communication line C. In a case where only the communication line C1 is allocated to the terminal organization 12, the allocated bandwidth deciding unit 24 determines that there is no other available communication line C. In a case where there is no other available communication line C (No in S10), the processing is finished. In this case, for example, communication is executed after execution of the reducing processing described above.

In a case where there is another available communication line C (Yes in S10), the effective bandwidth acquiring unit 22 acquires an effective bandwidth AB of the other communication line C in a unit time same as a unit time for which allocated bandwidths on the communication line C1 have been calculated (S11). In this example, it is assumed that the effective bandwidth acquiring unit 22 acquires an effective bandwidth AB of a communication line C2 as the effective bandwidth AB of the other communication line C.

The allocated bandwidth deciding unit 24 calculates a sum of bandwidths (id) of priority targets of the five users who use the communication line C1, and in a case where the sum is equal to or smaller than the effective bandwidth AB of the communication line C2 (Yes in S12), the allocated bandwidth deciding unit 24 allocates the excess communication request to the communication line C2 (S13). That is, the allocated bandwidth deciding unit 24 allocates excess distributed data of the users to the communication line C2. In this case, distributed data of the users other than the excess distributed data is transmitted or received by using the communication line C1, and the excess distributed data of the users is transmitted or received by using the communication line C2. In another example, the allocated bandwidth deciding unit 24 may allocate, to the communication line C2, all communication requests of the five users scheduled to be allocated to the communication line C1. That is, the allocated bandwidth deciding unit 24 may allocate, to the communication line C2, both of the distributed data of the users other than the excess distributed data and the excess distributed data of the users. In this case, all distributed data of the users is transmitted or received by using the communication line C2.

In a still another example, the allocated bandwidth deciding unit 24 calculates a sum of excess bandwidths of the five users, and in a case where the sum of the excess bandwidths is equal to or smaller than the effective bandwidth AB of the communication line C2 (Yes in S12), the allocated bandwidth deciding unit 24 may allocate excess communication requests to the communication line C2 (S13). Also in this case, distributed data of the users other than the excess distributed data is transmitted or received by using the communication line C1, and the excess distributed data of the users is transmitted or received by using the communication line C2.

In a case where the sum of bandwidths (id) of the priority targets of the five users exceed the effective bandwidth AB of the communication line C2 (No in S12), the processing returns to S10. In a case where there is another communication line (e.g., a communication line C3), processes in S11 and subsequent steps are executed. In another example, the processing may return to S10 in a case where the sum of the excess bandwidths of the five users exceeds the effective bandwidth AB of the communication line C2 (No in S12).

The allocated bandwidth deciding unit 24 may allocate the excess bandwidths by distributing the excess bandwidths to plural other communication lines.

Figure 11:
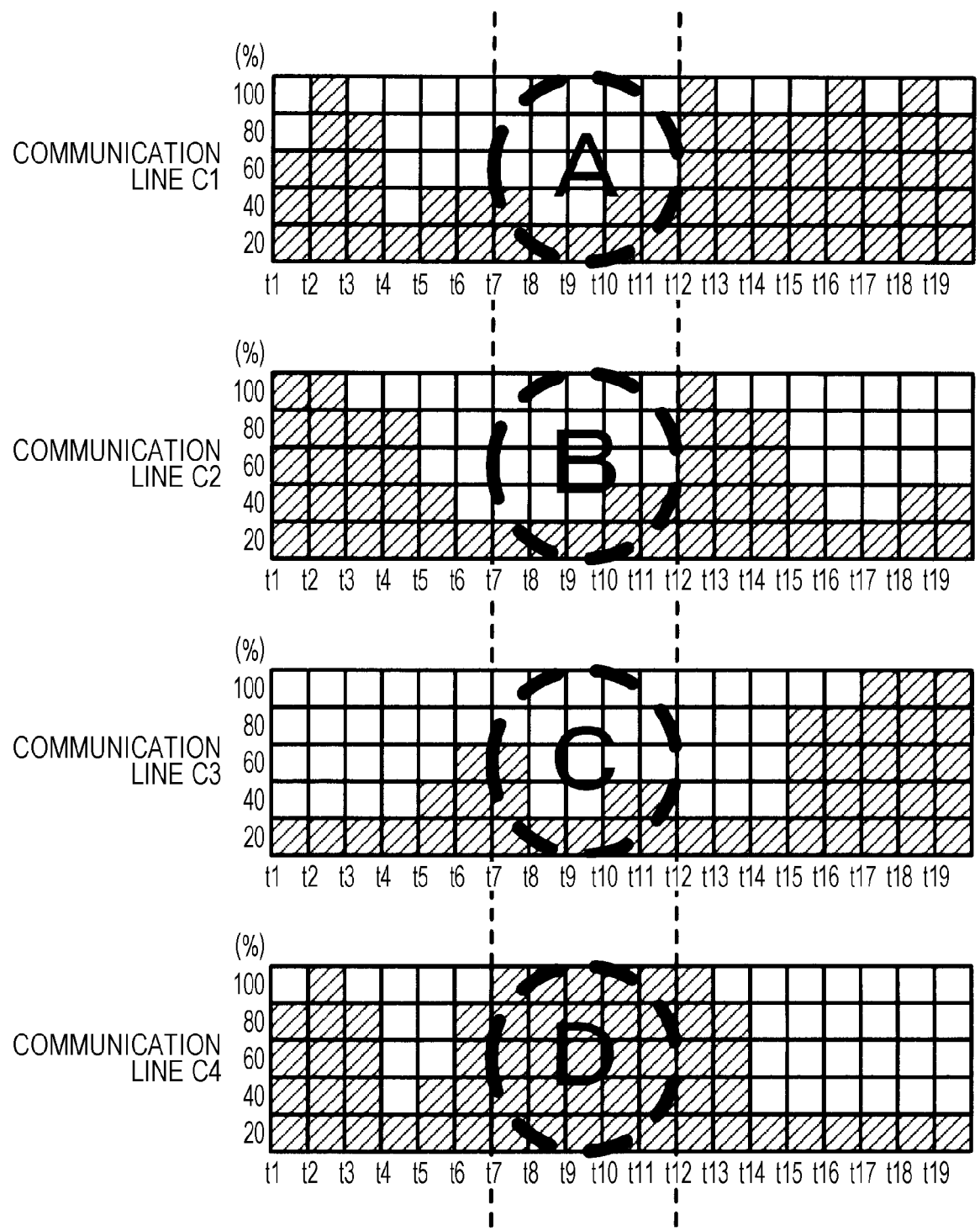
FIG. 11 illustrates a state of use of a communication line.

Modification 1 is described below by using a specific example with reference to FIG. 11. FIG. 11 illustrates states of use of communication lines. FIG. 11 illustrates communication states of the communication lines C1, C2, C3, and C4. The horizontal axis represents a time, and the vertical axis represents a use rate [%] of a communication line. The hatched part indicates that a communication line is being used.

For example, in unit times (t7 to t11), a use rate of the communication line C4 is 100%, and there is no available communication capacity (bandwidth) on the communication line C4. Meanwhile, in the unit times (t7 to t11), there is an available communication capacity on the communication lines C1, C2, and C3. In this case, in a case where a user who mainly uses the communication line C4 requests communication and an allocated bandwidth corresponding to the request for communication exceeds an unused bandwidth of the communication line C4 and cannot be allocated to the communication line C4, the allocated bandwidth deciding unit 24 allocates the allocated bandwidth to any of the communication lines C1, C2, and C3. Specifically, the allocated bandwidth deciding unit 24 allocates the allocated bandwidth to a communication line whose unused bandwidth is equal to or larger than the allocated bandwidth among the communication lines C1, C2, and C3. This allows the user to perform communication by using this communication line.

Note that chipping switching control described in Japanese Unexamined Patent Application Publication No. 2013-236182 may be applied to Modification 1. The chipping switching control is control for chipping an excess communication amount (e.g., a packet group) and switching a communication line used for communication of the chipped communication amount to another communication line having an available bandwidth. This control may be performed, for example, by the allocated bandwidth deciding unit 24.

Modification 2

Modification 2 is described below. In Modification 2, in a case where an allocated bandwidth allocated to a user exceeds the effective bandwidth of the communication line C, the allocated bandwidth deciding unit 24 changes a time of communication requested by the user so that the allocated bandwidth does not exceed the effective bandwidth. More specifically, in a case where a sum of allocated bandwidths allocated to users in the same time exceeds the effective bandwidth of the communication line C, the allocated bandwidth deciding unit 24 changes a time of communication requested by one or more users so that the sum of the allocated bandwidths does not exceed the effective bandwidth in each time. In this way, the allocated bandwidth deciding unit 24 prevents a sum of allocated bandwidths from exceeding the effective bandwidth of the communication line C by shifting a time of communication requested by one or more users.

Modification 2 is described in detail below. A traffic pattern is generated for each user, and data of the traffic pattern is stored in the storage unit 28. A traffic pattern of a user is a pattern indicative of a temporal change of a traffic amount of communication performed by the user by using the communication line C. For example, a traffic pattern during a predetermined period (e.g., one day, one week, one month, or one year) is measured for each user, and a traffic pattern is generated for each user. The traffic pattern may be generated by the communication management apparatus 10 or may be generated by another apparatus such as a server. For example, a measurement unit is provided in the communication management apparatus 10, and the measurement unit measures a traffic amount of communication performed by each user (each terminal apparatus 14) and generates a traffic pattern by statistically processing a result of the measurement.

Figure 12:
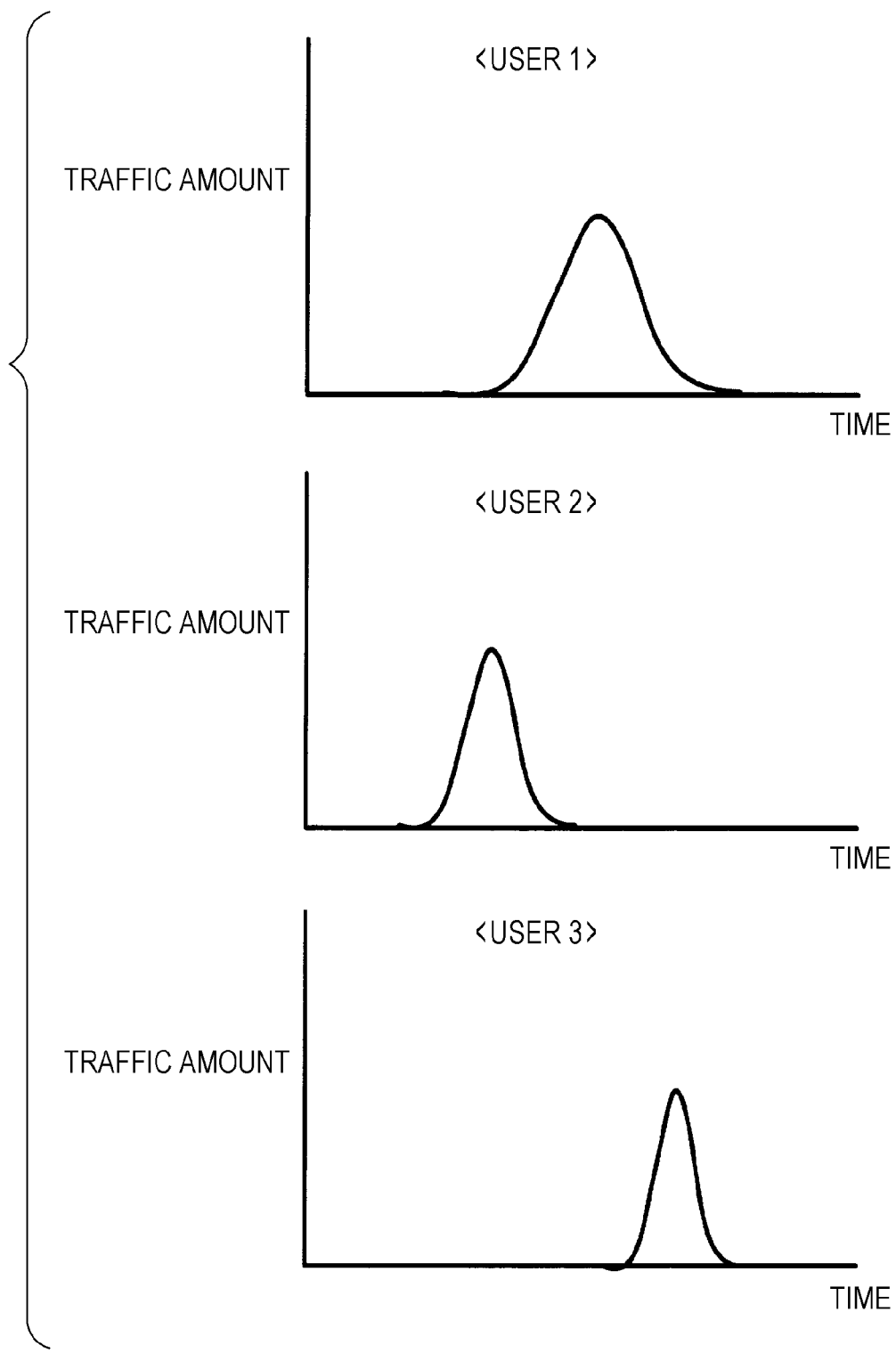
FIG. 12 is a schematic view illustrating traffic patterns of users.

FIG. 12 illustrates an example of traffic patterns of users 1, 2, and 3. The traffic patterns are schematically expressed.

Each of the traffic patterns is, for example, an average traffic pattern in one day (24 hours). The horizontal axis represents a time from 0 o'clock to 24 o'clock, and the vertical axis represents a traffic amount (a bandwidth used by a user). The traffic patterns of the users 1, 2, and 3 are different from one another in terms of a peak time of the traffic amount and a spread width of the pattern. Data of the traffic patterns of the users 1, 2, and 3 is stored in the storage unit 28.

Furthermore, features of the traffic patterns may be calculated, and data of the features may be stored in the storage unit 28 together with the data of the traffic patterns. For example, a peak time of the traffic amount and a peak traffic amount may be calculated as the features, and these pieces of data may be stored in the storage unit 28. Alternatively, a feature vector having a peak time and a peak traffic amount as components may be calculated as features, and information indicative of the feature vector may be stored in the storage unit 28. The features may be calculated by the measurement unit of the communication management apparatus 10 or may be calculated by another apparatus such as a server.

In a case where a new user uses the communication line C, data of a default traffic pattern generated in advance may be temporarily stored in the storage unit 28 as data of a traffic pattern of the user since the traffic pattern of the user has not been generated yet. In a case where the user has performed communication and a traffic pattern has been generated on the basis of a history of the communication, data of the traffic pattern generated on the basis of the history of the communication may be stored in the storage unit 28 instead of the data of the temporary traffic pattern.

The allocated bandwidth deciding unit 24 changes a time of communication requested by each user so that a sum of the traffic patterns of the users does not exceed the effective bandwidth of the communication line C. For example, the allocated bandwidth deciding unit 24 delays (shifts to a later time) communication of excess distributed data (e.g., packet) of the users. The allocated bandwidth deciding unit 24 delays distribution of the excess distributed data until a sum of traffic amounts (a sum of allocated bandwidths) in each time becomes equal to or smaller than the effective bandwidth.

A time zone to which communication can be shifted may be defined for each user. In this case, the allocated bandwidth deciding unit 24 allocates, for each user, communication of excess distributed data to a time zone of the user to which communication can be shifted. The time zone to which communication can be shifted is, for example, designated by the user.

Figure 13:
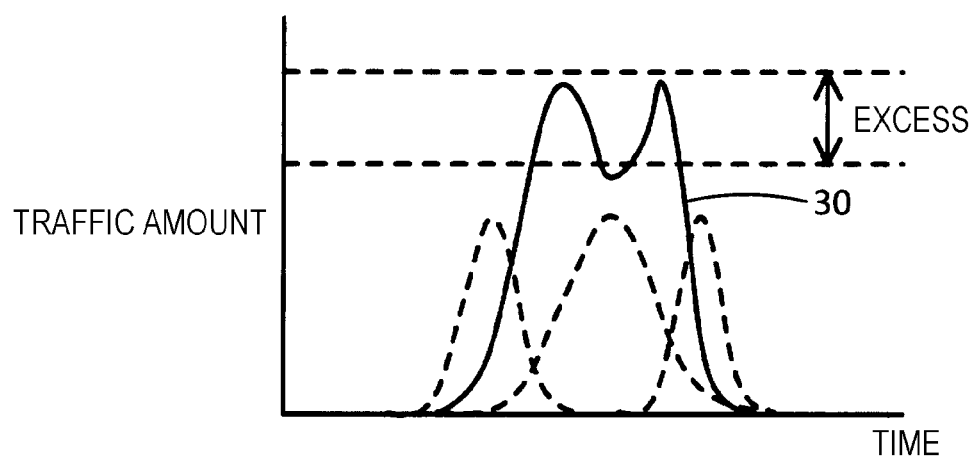
FIG. 13 is a schematic view illustrating a sum of the traffic patterns of the users.

FIG. 13 illustrates a sum pattern 30 that is a sum of the traffic patterns of the users 1, 2, and 3. A part of the sum pattern 30 exceeds ("excess" in FIG. 13) the effective bandwidth of the communication line C. In this case, the allocated bandwidth deciding unit 24 delays communication of distributed data (e.g., packet) corresponding to the excess communication amount.

Note that traffic shaping control described in Japanese Unexamined Patent Application Publication No. 2013-236182 may be applied to Modification 2. The traffic shaping control is control for delaying (shifting to a later time) communication of distributed data (e.g., packet) so that a sum of allocated bandwidths does not exceed an effective bandwidth of a communication line. This control may be performed, for example, by the allocated bandwidth deciding unit 24.

Modifications 1 and 2 may be combined. For example, the allocated bandwidth deciding unit 24 may execute both of the processing according to Modification 1 and the processing according to Modification 2. Alternatively, in a case where an excess communication amount occurs even when any one of the processing of Modification 1 and the processing of Modification 2 is executed, the allocated bandwidth deciding unit 24 may execute the other processing.

The communication management apparatus 10 is, for example, collaboration of hardware and software. Specifically, the communication management apparatus 10 includes one or more processors such as a CPU (not illustrated). The one or more processors read out and execute a program stored in a storage device (not illustrated), and thus the functions of the units of the communication management apparatus 10 are realized. The program is stored in the storage device via a recording medium such as a CD or a DVD or via a communication path such as a network. In another example, each unit of the communication management apparatus 10 may be realized, for example, by a hardware resource such as a processor, an electronic circuit, or an application specific integrated circuit (ASIC). A device such as a memory may be used to realize each unit of the communication management apparatus 10. In still another example, each unit of the communication management apparatus 10 may be realized by a digital signal processor (DSP), a field programmable gate array (FPGA), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor that is configured to:
    receive information indicative of a priority of communication designated by a user who uses a communication line available to a plurality of users and information indicative of a bandwidth of a priority target designated by the user; and
    decide an allocated bandwidth allocated to the user on a basis of evaluation of the priority and the bandwidth of the priority target,
    wherein the processor receives information indicative of priorities of communication designated by users included in the plurality of users and information indicative of bandwidths of priority targets designated by the users, decides allocation rates of the users on a basis of a standard deviation of a distribution of the priorities and decides allocated bandwidths allocated to the users on a basis of the bandwidths of the priority targets designated by the users and the allocation rates,
    in a case where there is a remaining effective bandwidth on the communication line after the allocated bandwidths allocated to users included in the plurality of users are decided, the processor allocates the remaining effective bandwidth to the users including a first user,
    wherein the processor determines a bandwidth difference between the bandwidth of the priority target designated by the first user among the users and the allocated bandwidth allocated to the first user, calculates a first bandwidth based on the bandwidth difference and the allocation rate of the first user, and allocates the first bandwidth to the first user.

2. The information processing apparatus according to claim 1, wherein
in a case where a sum of the allocated bandwidths allocated to the users exceeds an effective bandwidth of the communication line, the processor reduces the allocated bandwidths allocated to the users so that the sum does not exceed the effective bandwidth.

3. The information processing apparatus according to claim 1, the processor is further configured to decide a priority needed to maintain predetermined communication quality on the communication line instead of the priority designated by the user,
wherein the processor decides the allocated bandwidth by using the priority.

4. The information processing apparatus according to claim 3, wherein
the processor decides the priority needed to maintain the predetermined communication quality on a basis of a call loss probability of a service provided by using the communication line.

5. The information processing apparatus according to claim 1, wherein
a priority bundle for designation of a priority is allocated to the user; and
the processor is further configured to subtract a value according to a degree of priority of communication from the priority bundle.

6. The information processing apparatus according to claim 5, wherein
the value fluctuates in accordance with a bandwidth of a priority target designated by another user.

7. The information processing apparatus according to claim 1, wherein
in a case where the allocated bandwidth allocated to the user exceeds an effective bandwidth of the communication line, the processor allocates an excess bandwidth to another communication line having an available bandwidth.

8. The information processing apparatus according to claim 1, wherein
in a case where the allocated bandwidth allocated to the user exceeds an effective bandwidth of the communication line, the processor changes a time of communication requested by the user so that the allocated bandwidth does not exceed the effective bandwidth.

9. A non-transitory computer readable medium storing a program causing a computer to execute a process, the process comprising:
receiving information indicative of a priority of communication designated by a user who uses a communication line available to a plurality of users and information indicative of a bandwidth of a priority target designated by the user;
deciding an allocated bandwidth allocated to the user on a basis of evaluation of the priority and the bandwidth of the priority target, wherein information indicative of priorities of communication designated by users included in the plurality of users and information indicative of bandwidths of priority targets designated by the users are received, and allocation rates of the users on a basis of a standard deviation of a distribution of the priorities is decided, and allocated bandwidths allocated to the users is decided on a basis of the bandwidths of the priority targets designated by the users and the allocation rates; and
in a case where there is a remaining effective bandwidth on the communication line after the allocated bandwidths allocated to users included in the plurality of users are decided, allocating the remaining effective bandwidth to the users including a first user,
wherein allocating the remaining bandwidth to the users comprises:
determining a bandwidth difference between the bandwidth of the priority target designated by the first user among the users and the allocated bandwidth allocated to the first user;
calculating a first bandwidth based on the bandwidth difference and the allocation rate of the first user; and
allocating the first bandwidth to the first user.

10. An information processing apparatus comprising:
receiving means for receiving information indicative of a priority of communication designated by a user who uses a communication line available to a plurality of users and information indicative of a bandwidth of a priority target designated by the user; and
allocated bandwidth deciding means for deciding an allocated bandwidth allocated to the user on a basis of evaluation of the priority and the bandwidth of the priority target,
wherein the receiving means receives information indicative of priorities of communication designated by users included in the plurality of users and information indicative of bandwidths of priority targets designated by the users,
and the allocated bandwidth deciding means decides allocation rates of the users on a basis of a standard deviation of a distribution of the priorities and decides allocated bandwidths allocated to the users on a basis of the bandwidths of the priority targets designated by the users and the allocation rates,
in a case where there is a remaining effective bandwidth on the communication line after the allocated bandwidths allocated to users included in the plurality of users are decided, the allocated bandwidth deciding means allocates the remaining effective bandwidth to the users including a first user,
wherein the allocated bandwidth deciding means determines a bandwidth difference between the bandwidth of the priority target designated by the first user among the users and the allocated bandwidth allocated to the first user, calculates a first bandwidth based on the bandwidth difference and the allocation rate of the first user, and allocates the first bandwidth to the first user.

* * * * *